UNITED STATES PATENT OFFICE.

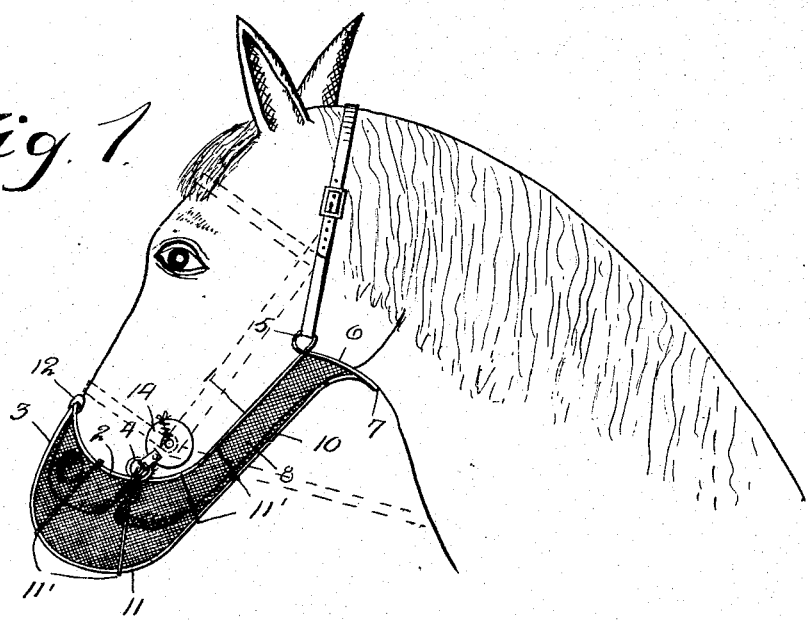

PERREN COTTINGHAM, JESSE COTTINGHAM, AARON ARROWSMITH, AND GUY H. TARVIN, OF SISSETON, SOUTH DAKOTA.

NOSE-GUARD.

1,177,489.   Specification of Letters Patent.   Patented Mar. 28, 1916.

Application filed March 12, 1912. Serial No. 683,374.

*To all whom it may concern:*

Be it known that we, PERREN COTTINGHAM, JESSE COTTINGHAM, AARON ARROWSMITH, and GUY H. TARVIN, citizens of the United States, residing at Sisseton, in the county of Roberts and State of South Dakota, have invented certain new and useful Improvements in Nose-Guards, of which the following is a specification.

This invention has for its object to provide a device for protecting the nose, mouth and jaws of horses and other animals against the attacks of insects.

The invention further has for its object to provide a device for protecting the nose, mouth and jaws of horses and other animals against the attacks of insects, which may be readily adjusted in place on the animal.

Referring to the accompanying drawing: Figure 1 is a view of the invention showing it in position for use. Fig. 2 is a view thereof showing it detached.

The device constructed in accordance with this invention consists of a frame formed of stout, flexible wire having the longitudinal portions 1, the curved portions 2 extending over one end of the longitudinal portions 1, and terminating in the upwardly projecting curved portion 3. The curved portions 2, intermediate of their ends are formed on each side with a loop 4, serving to render the portions 2 elastic and adapt them to be fitted in place as hereinafter set forth. The other ends of the portions 1 are formed with the loops 5, to render the parts elastic, the wire extending from said loops rearwardly, formed with the side curved portions 6 and united by the curved cross portion 7. The loops 5 are carried on opposite sides of the frame, assist in positioning the guard on the horse's head and engage the side faces of the jaws of the animal. Thus no obstruction is provided for the throat of the animal and free movement of the head of the animal may be had without resulting in chafing or injury. Secured to the several portions of wire, bent as hereinafter described, in any suitable manner, is a strip of gauze 8, which is of trough shape between the members 1, and is formed between the members 2 in the shape of a concave receptacle extending up to the curved portion 3. The gauze extends at its upper end to the transverse curved portion 7 and is secured thereto and to the side portions 6. The gauze may be secured to the several portions described by bending its edges over the same and securing them to the frame in any suitable manner, and as here shown, preferably by means of the metallic sleeves 9. The frame is reinforced and strengthened by means of a rod 10, curved at one end and connected to the transverse, curved portion 7, and extending down longitudinally on the rear side of the gauze and having the curved portion 11 extending under the concave receptacle, and secured at its end to the curved portion 3 of the frame. This rod 10 serves to brace the gauze, and to give additional support thereto cross wires 11' are provided, which are twisted about the rod 10 between their ends, and secured to the frame by bending their ends over the same. In order to prevent the curved portion 3 from chafing the animal, the strip of leather 12, or other suitable material, is secured by strips 13, or other suitable means, to the curved portion 3 of the frame.

In order to protect the sides of the mouth of the animal from insects washers 14 are provided, which are located between the bit and the sides of the lower curved portions of the frame. The side portions of the frame being flexible, the device can be secured to a horse or other animal by springing it into place, the concave receptacle at the lower end of the device fitting over the mouth at the sides and end thereof, and the curved portion 3 bearing against the front of the nose. The oblong, trough shaped portion of the device extends between the under side of the head with the side portions 2 bracing against the sides of the head and the upper curved end of the device being located beneath the throat of the animal.

The device hereinbefore described, of course, conforms in size to the size of the head of the animal with which it is to be used, and, in the case of horses, is of such a size as to fit over the mouth, nose and jaws, under side of the head, and over the harness which has been placed on the head of the horse.

It will be seen that by means of a device constructed as hereinbefore set forth, that it may be readily applied to the animal's head and detached therefrom, by reason of the elastic, clamping construction of the frame, and that it will fit over the nose, mouth and jaws of the animal, so as to effectively protect those parts from attacks by insects, thereby preventing the animal from becoming restive and irritable on account of such attacks.

Having described the invention, we claim:

A nose guard comprising a wire frame consisting of similar side portions adapted to engage the sides of the head of an animal and a nose receiving portion, said frame being covered with a layer of foraminous material to receive the nose and mouth of the animal in the nose receiving portion thereof, attaching loops carried on opposite sides of the nose receiving portion of the frame, and attaching loops carried adjacent to the upper ends of the respective side portions of the frame and adapted to engage the opposite sides of the head of the animal to assist in positioning the guard.

In testimony whereof we affix our signatures in presence of two witnesses.

PERREN COTTINGHAM.
JESSE COTTINGHAM.
AARON ARROWSMITH.
GUY H. TARVIN.

Witnesses:
FRANK E. TASKER,
HENRY ERNST.

Copies of this patent may be obtained for five cents each, by addressing the "Commissioner of Patents, Washington, D. C."